Nov. 11, 1969   R. K. McKIBBEN   3,477,572
VIBRATORY SEPARATOR

Filed May 22, 1967   2 Sheets-Sheet 1

INVENTOR
RICHARD K. McKIBBEN
BY
*Julian J. Schamin*
ATTORNEY

Nov. 11, 1969  R. K. McKIBBEN  3,477,572
VIBRATORY SEPARATOR

Filed May 22, 1967  2 Sheets-Sheet 2

INVENTOR
RICHARD K. McKIBBEN
BY
ATTORNEY

United States Patent Office 3,477,572
Patented Nov. 11, 1969

3,477,572
VIBRATORY SEPARATOR
Richard K. McKibben, La Canada, Calif., assignor to SWECO, Inc., a corporation of California
Filed May 22, 1967, Ser. No. 640,242
Int. Cl. B07b 1/40, 1/06
U.S. Cl. 209—255         5 Claims

ABSTRACT OF THE DISCLOSURE

A vibratory separator including a housing structure with a circular screen positioned horizontally therein, the screen having a central aperture and a conical duct attached to the aperture for directing material passing therethrough; a first discharge duct and a second discharge duct isolated from the first discharge duct and means for vibrating the screen and housing structure; a vertical conduit projecting through the aperture and isolated from the vibrations generated by the vibrating means, and horizontal fluid-bearing conduits communicating with the vertical conduit and adapted to spray the underside of the screen with a cleaning fluid.

---

This invention relates to vibratory separators employing screens and more particularly to an improved separator adapted for constant or intermittent cleaning of the screen while the device is in operation.

Vibratory horizontal screen separating devices for example of the type disclosed in U.S. Patents 3,035,700; 3,156,643; 3,029,946; 3,777,578; 2,753,999; 2,714,961; 2,696,302; 2,676,706 and 2,284,671, have attained wide acceptability in the industry for the separation of solids of varying sizes and for the separation of small amounts of solids in a relatively large amount of liquid. In certain applications, the material fed to the screen to be separated tends to bridge the screen openings, thus clogging the device and limiting its capacity.

It is therefore an object of this invention to provide an improved vibratory separator.

Another object of this invention is to provide a vibratory separator in which the screen can be cleaned from underneath.

It is still another object of this invention to provide a vibratory separator having provision for cleaning the screen from the bottom without disassembly of the unit.

Still other objects of this invention will become apparent from the ensuing specification.

The objects of this invention are, in part, accomplished by a vibratory horizontal screening apparatus which is adapted with an aperture through the screen, through which aperture projects a vertical conduit for carrying a cleaning fluid, such conduit communicating with horizontal fluid bearing conduits adapted to spray the underside of the screen with a cleaning fluid to clear the screen.

In one embodiment of the invention, a circular vibratory screening apparatus having a center discharge opening is provided with the fluid conduit projecting through the approximate center of the discharge opening and having radial arms disposed beneath the screen. In this embodiment of the invention, a conical or cylindrical funnel may be provided attached to the inner peripheral tension ring of the screen for conducting oversize material into a discharge duct which is detached from the funnel to provide space for the lateral arms. In another embodiment of the invention, the funnel member may be integral with the discharge duct. In still another embodiment of the invention, a vibratory screening separator may be adapted for peripheral discharge.

Reference is directed to the drawings accompanying the specification in which.

Figure 1:
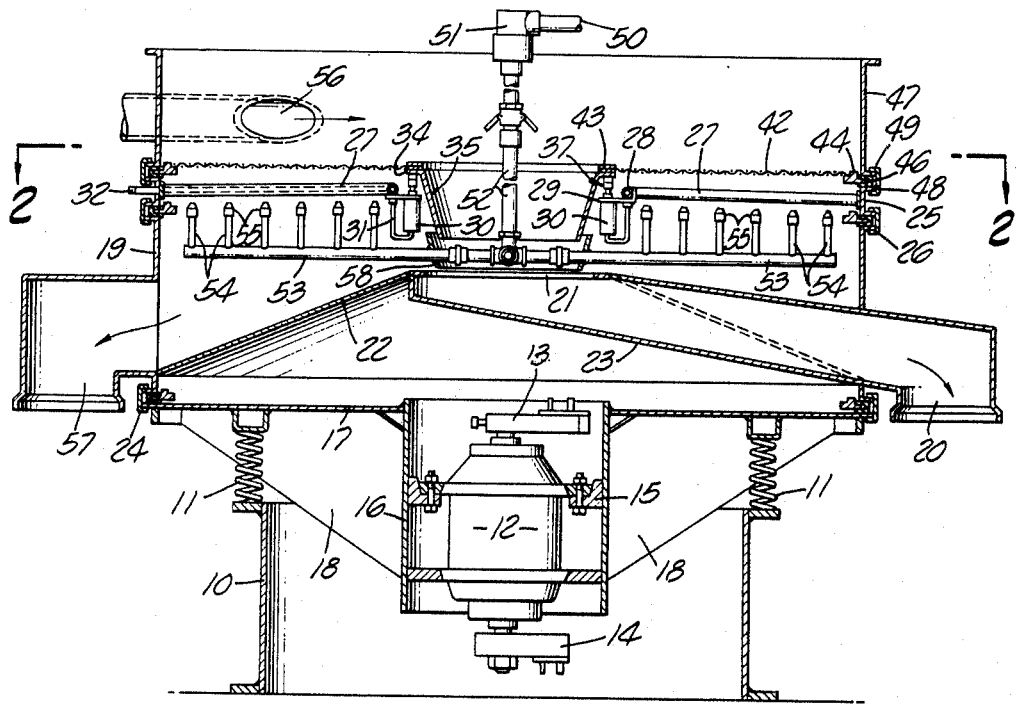
FIGURE 1 is a vertical cross-section view (taken through line 1—1 of FIGURE 2) of a vibratory screening apparatus having a circular configuration.

Referring now to the drawings, the vibratory shaking or screening device, as shown in FIGURE 1, consists of a base frame 10 on the upper portion of which is mounted a ring of springs 11 which supports the vibratory screening device and isolates the vibrations imparted upon such device from the base frame 10.

A vibratory unit comprising a motor 12 and upper and lower eccentric weights 13 and 14 respectively, is mounted by means of the mounting brackets 15 to a cylindrical extension 16 of the upper base 17 which is supported on the ring of springs 11 and is reinforced by gusset plates 18 which project between the springs 11.

The relationship of the vibratory unit and the base frame 10, as described above, may be varied by other arrangements. For example, a motor may be mounted upon the base frame 10. A belt drive from such motor extends to and rotates the eccentric weights which are mounted on the upper base 17.

On the upper base 17 is mounted a cylindrical spacing frame 19 having a discharge duct 20 projecting therefrom and communicating with a cylindrical opening 21 in the appropriate center through the dome shaped collector pan 22.

Secured to the interior of the spacing frame 19 is a sloping receiving pan 23 which is inclined and which is isolated from the interior of the discharge duct 20 by the walls of the opening 21. The pan 23 slopes upwardly from the lower position of the frame 19 and communicates with the walls of the opening 21. At the bottom of the frame 19 is a clamp ring 24 which secures the lower edge of the frame 19 to the upper base 17.

On the cylindrical spacing frame 19 is mounted a cylindrical screen tension spacing frame 25, the lower edge of which is secured to the spacing frame 19 by the clamp ring 26.

Figure 2:
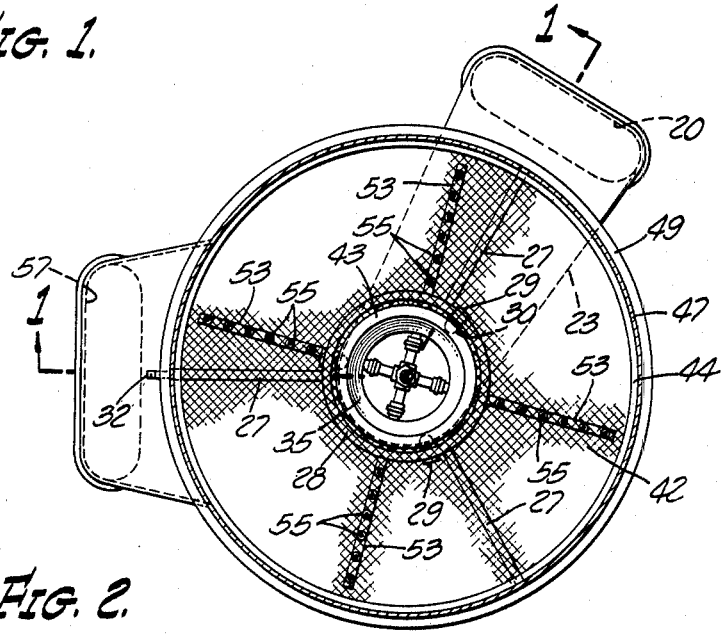
FIGURE 2 is a top plan view partially in cut-away of the vibratory screening apparatus of FIGURE 1 taken along the line 2—2 of FIGURE 1.
Figure 3:
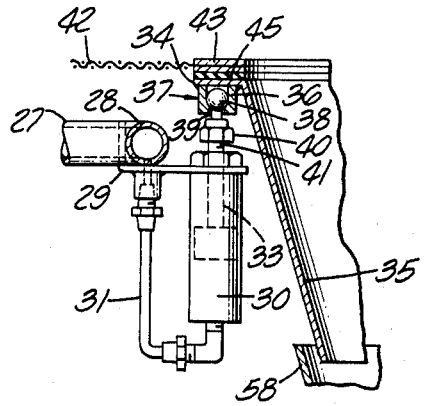
FIGURE 3 is an enlarged side view of a portion of the improved support and tensioning means shown in FIGURE 1.

Affixed by welding or other suitable means to the interior wall of the frame 25 at spaced intervals about the periphery of the frame 25 are three horizontally positioned hollow struts or pipes 27 which radiate inwardly from the periphery of the frame 25 toward the center of the frame 25. As shown in FIGURE 2, the inwardly radiating hollow struts 27 communicate with the hollow support ring or circular pipe 28 and are affixed thereto by welding, threaded coupling or other suitable means. As best shown in FIGURE 3, L-shaped brackets 29 are affixed by welding or other suitable means to the ring 28 at spaced intervals about the ring 28 (FIGURE 2). Vertically positioned air cylinders 30 are affixed by bolting, welding or other suitable means to the provided brackets 29 which support the air cylinders 30. Affixed to the lower portion of each air cylinder 30 is a U-shaped air line 31, which communicates with the hollow ring 28. The radiating struts 27 and circular ring 28 function as a support and also as a means to pass air to the air cylinders 30. In FIGURES 1 and 2, air line fitting 32 in the cylindrical frame 25 communicates with one of the hollow struts 27. Therefore, the piston 33 of the air cylinder 30 may be actuated by passing air from the fitting 32 into the hollow struts 27, the air then passing into the circular ring 28 and being distributed into the air lines 31 spaced at intervals around the ring 28 and which communicate with the air cylinder 30.

Although the struts 27 and ring 28 as above described are employed to function as air lines to the respective air cylinders 30, it should be observed that as an alternative arrangement an internal air line (not shown) may pass through one or more of the struts 27 and ring 28, ultimately communicating with each air cylinder 30 by an air line similar to 31.

Because only a single air line 31 is affixed to the lower portion of the air cylinder 30 as shown in FIGURES 1, 2, and 3, the cylinder 30 is capable of actuating the piston 33 only upward relying on gravity for any return or downward movement of the piston 33. It should, however, be observed that a double actuating cylinder may be employed where, by virtue of an air line at the lower and upper portion of the cylinder, the piston may be actuated upward or downward in a manner which is commonly known in the art. Further, the cylinder 30 need not necessarily be air actuated, but may also be liquid actuated.

As best shown in FIGURE 3, affixed by welding or other suitable means to the underside of the peripheral flange 34 of the conical funnel 35 is the socket 36 of a toggle pad 37. Downwardly projecting from the ball 38 which is supported within the socket 36 is a bolt 39 which is welded, bolted or otherwise securely affixed to the nut 40. The internally threaded nut 40 is secured to the external threads 41 provided on the upper portion of the piston 33. With the upper peripheral flange 34 of the funnel 35 welded or otherwise secured to the socket 36 of the toggle pad 37, the funnel 35 is swivelly mounted at spaced intervals about the periphery of the flange 34 to the pistons 33 which project from their respective air cylinders 30.

As shown in FIGURE 1, the inner periphery and outer periphery of the horizontal screen 42 are secured to inner and outer tension rings 43 and 44 respectively, thus forming a rigid single unit. The inner periphery of the screen 42 is affixed to the inner tension ring 43 by spot welding, bonding or other suitable means. The outer periphery of the horizontal screen 42 rests upon the outer marginal tension ring 44 and is bonded, spot welded or otherwise affixed thereto. Upon affixing the peripheries of the screen 42 to the tension rings 43 and 44, the screen 42 and tension rings 43 and 44 form a single rigid and removable unit. The screen assembly is placed onto the vibratory separator unit so that the inner tension ring 43 merely rests upon the outwardly projecting peripheral flange 34 of the conical funnel 35 which, as previously described, is swivelly mounted upon the pistons 33 by virtue of the toggle pads 37.

In FIGURE 3, a circular ring 45 (FIGURE 3) of rubber, polyurethane or other suitable material which is affixed in a suitable manner to the upperside of the peripheral flange 34 reduces the abrasive action between the tension ring 43 and flange 34 which would exist during the vibratory operation of the separator unit.

A lip 46 projects outwardly from the outer margin of the tension ring 44, the lip 46 being interposed between the spacing frames 25 and 47 and resting upon the flange 48 which projects outwardly from the upper periphery of the spacing frame 25. A clamp ring 49 secures the spacing frames 25 and 47 and the interposed flange 46 of the tension ring 44.

By virtue of the arrangement of the funnel 35 whereby the lower periphery of the funnel 35 is disposed above and not affixed to the walls of the opening 21, a rotating screen cleaning apparatus may be disposed beneath the shaking screen.

The steam jet arrangement consists of a steam entry line 50 which feeds a rotary coupling 51 which is, in turn, attached to a vertical pipe 52 which passes through the center discharge opening and at the end of which are radiating arms 53 having vertical legs 54 which project upwardly toward the underside of the screen 42, the end of such legs being provided with steam jet attachments 55.

The steam jets 55 are so arranged that when steam flows through the lines 50, 52, 53 and 54 the reaction pressure from the steam emitted from the nozzles 55 causes the assembly consisting of the pipe 52, arms 53 and legs 54 to rotate in the coupling 51 so that the entire underside screen surface is treated with the steam during application.

The fluid flowing in the lines to accomplish the cleaning need not be steam but may be any suitable solvent which will melt or dissolve the material which causes the screen clogging or bridging. Thus, under certain circumstances, hot water may be employed to effect the desired steam cleaning.

The lower portion of the vertical pipe 52 is secured to the upper portion of the vertical pipe 52 by virtue of the quick disconnect coupling 59.

The steam cleaning apparatus is pre-assembled into the device, but is mechanically separated therefrom so that no vibration is imparted to the steam cleaning apparatus.

The support and tensioning device of FIGURES 1, 2, and 3 utilize the chute 35 where by the flange 34 of the chute 35 is affixed to the upper portion of the piston 33 by the toggle 32. Further, because the lower periphery of the chute 35 is disposed above the walls of the opening 21, the radiating arms 53 of the cleaning arrangement may rotate.

Figure 4:
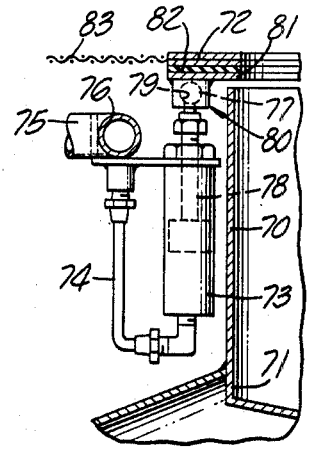
FIGURE 4 is an enlarged view of another embodiment of the arrangement shown in FIGURE 3.

In FIGURE 4, an alternative support and tensioning arrangement is shown. The lower periphery of the chute 70 is either affixed to or fabricated as an extension of the walls of the opening 71, such chute extending upward to a point slightly below the inner tension ring 72.

The air cylinder 73, air line 74, struts 75, and support ring 76 are disposed in the manner as described for the support and tension device of FIGURES 1, 2 and 3. In FIGURE 4, the ball 77 at the upper portion of the piston 78 is swivally mounted in the socket 79 of the toggle pad 80. The pocket 79 of the toggle pad 80 is welded or otherwise suitably secured to the circular mounting plate 81 upon which rests the inner tension ring 72. A sealing ring 82 of polyurethane or other suitable material affixed to the top of the circular plate 81 is interposed between the plate 81 and overlying tension ring 72.

The support and tensioning means of FIGURE 4 operates to raise or lower the inner tension ring 72 and its integrally assembled screen 83. The chute 70 remains stationary as it is affixed to the walls of the opening 71.

It should be observed that because the chute 70 in the arrangement of FIGURE 4 is affixed to the walls of the opening 71 and extends to a point just below the tension ring 72, the rotating cleaning arrangement of FIGURES 1, 2 and 3 may not be employed. However, the radiating arms 53 (FIGURE 1) of the cleaning arrangement may project through the wall of the chute 70 FIGURE 4 and, without rotating, spray the underside of the screen 83 by virtue of canted nozzles 55 (FIGURE 1) which direct the spray to contact virtually the entire screen surface.

The apparatus as above described may be equipped with a feed arrangement consisting for example of a feed pipe 56 (FIGURE 1) which tangentially enters the spacing frame 47, thus forcefully distributing material to be separated onto the outer periphery of the shaking screen 42.

Prior to operation of the vibratory separator and by virtue of the screen tension arrangement as previously described, the pistons 33 of the air cylinders 30 are vertically actuated to a predetermined height so as to raise the funnel 35 and overlying inner screen tension ring 43 to a height which sufficiently tensions the shaking screen 42 to prevent "screen flopping" during operation of the vibratory separator.

The separator functions to separate materials of two different sizes (or liquid from solid) through the screen 42, by virtue of the vibratory motion imparted by the vibratory unit, including upper and lower eccentric weights 13 and 14 and the feed arrangement by which the material to be separated is fed onto the outer periphery of the screen 42. As the material to be separated is fed onto the screen 42, the imparted vibratory motion causes the material to move along the screen 42, the oversize portion of the material being discharged through the discharge opening 21. In the arrangement as shown in FIGURE 4, a flange (not shown) may downwardly project from the inner periphery of the inner tension ring 72, to prevent discharging oversize material from passing through the space between the upper periphery of the chute 70 and the tension ring 72. It should be observed that the screen tensioning arrangement of this invention whereby the inner tension ring 43 and central area of the screen are slightly raised to tension the screen 42 aids in preventing the liquid fed onto the screen 42 from discharging through the oversize opening 20 as the liquid must move up a slight incline during its movement from the outer periphery of the screen 42 toward the inner periphery of the screen 42. Further, in the device of FIGURE 1, oversize material discharged down the chute 35 is prevented from splashing through the space between the lower periphery of the chute 35 and upper periphery of the opening 21, by virtue of a conical shaped deflector cone 58 affixed to the rotating arms 53 of the cleaning apparatus. The radiating arms 53 project through the cone 58, such cone rotating with the rotating arms 53.

The undersize material which passes through the screen 42 falls onto the receiving pan 22 and, by falling along the dome-shape of the receiving pan 22 and around the inside of the frame 19, is ultimately discharged through the discharge duct 57.

By the unique arrangement of the inner screen tension ring 43, funnel 35 and pan 22, whereby the inner screen tension ring 43 merely rests on the flange 34 of the funnel 35 and the funnel 35 not being affixed to the pan 22, the shaking screen 42 or the tensioning device of this invention may be easily removed from the vibratory separator.

To remove the shaking screen 42, the clamp ring 49 is loosened from its clamping position and the spacing frame 47 removed from the separator unit. The screen 42 may now be easily lifted from the vibratory separator without the necessity of unfastening the inner tension ring 43 from any tie down arrangement as was previously required by conventional arrangements.

Further, to remove the tensioning device of this invention, the clamp ring 26 is loosened, thus enabling easy removal of the spacing frame 25 with its integrally arranged tensioning device consisting of the pipes 27, ring 28, cylinders 30, and funnel 35 which is threadably mounted to the pistons 33 by virtue of the toggle pads 37.

Upon removal of the tensioning device, as above described, the cleaning apparatus including the radiating arms 53 may be lifted from the separator unit.

The above-described screen support and tensioning device has been shown to be applicable to a center discharge type separator. It should be observed that the device of this invention may also be employed with a vibratory separator employing a planar screen without a center discharge opening.

Figure 5:
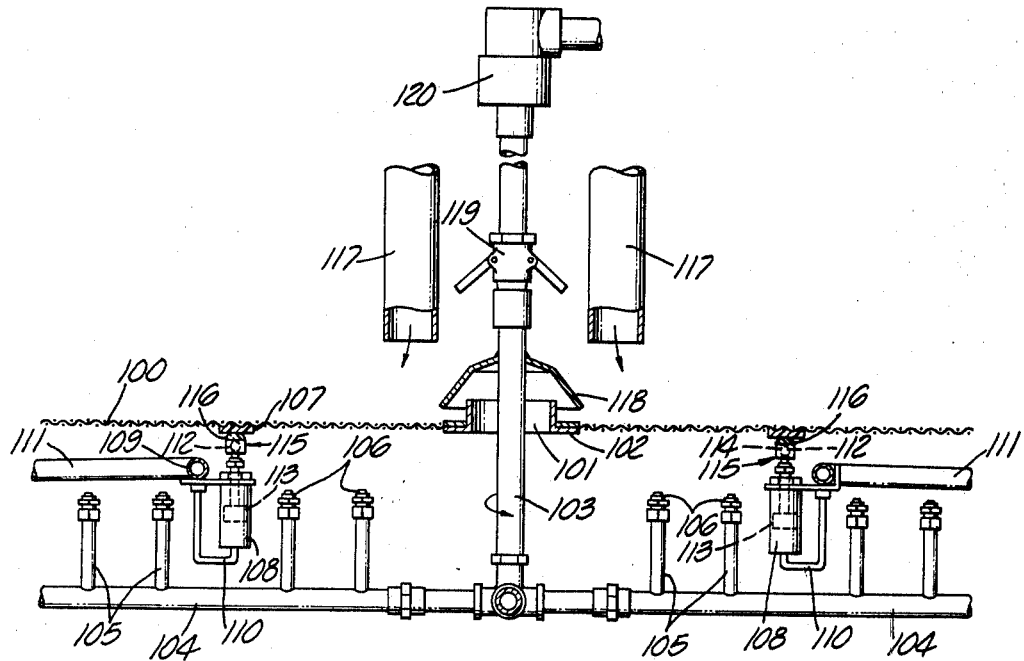
FIGURE 5 is an enlarged partial cross-section of another type of vibratory screening apparatus showing a support and tensioning means according to this invention.

In FIGURE 5, the outer periphery of the vibrating screen (not shown) is secured in an outer tension ring (not shown) and such ring interposed between upper and lower spacing frames (not shown) in a manner as described for the device of FIGURE 1. The center of the screen 100 is provided with an opening 101. Affixed in a suitable manner to the inner periphery of the screen 100 is a circular flange 102, the vertical portion of which projects slightly above the plane of the screen 100. The central opening 101 of the screen 100 is provided to enable the vertical pipe 103 of the cleaning apparatus to pass through the screen 100. The lowermost portion of the vertical pipe 103 communicates with radiating arms 104 from which vertical legs 105 extend. The upper portion of such legs are provided with canted spray nozzles 106.

A circular ring 107 of polyurethane or other suitable shock absorbing material is secured in a suitable manner to the screen 100. A polyurethane ring is preferred as it may be molded into the screen mesh resulting in the upper portion of the ring 107 being flush with the screen surface.

The circular ring 107 may be mounted to the screen 100 at any radial distance from the screen center which, upon actuating the support and tensioning device against the ring 107, would sufficiently tension the entire screen area to prevent "screen flopping" during the vibratory operation.

The vertical air cylinder 108, circular ring 28, air line and radiating struts 27 are arranged in the same manner as in the device of FIGURE 1.

The ball 112 at the upper portion of the piston 113 is swivally mounted in the socket 114 of the toggle pad 115. A pad 116 of polyurethane or other suitable material is mounted in a suitable manner to the socket 114 of each toggle pad 115. As an alternative, the pad 116 may consist of a circular ring (not shown) with the socket 114 of the toggle pads 116 secured in a suitable manner to the bottom of such pad at spaced intervals about the circular pad 116.

Prior to the operation of the vibratory separator of FIGURE 5, the pistons 113 of the air cylinders 108 are actuated to raise the circular ring 107 and its integral screen 100 to a height to sufficiently tension the screen 100.

Although not constituting a part of the present invention, one or more vertical feed pipes 117 distribute material onto the central area of the screen 100. Material fed onto the central area of the screen 100 is prevented from passing through the opening 101 in the screen 100 by virtue of a deflector cone 118 affixed to the rotating vertical pipe 103 of the rotating cleaning apparatus.

The deflector cone 118 is disposed above the opening having its lower periphery extending beyond the periphery of the opening 101. The vertical portion of the circular flange 102 also prevents material fed onto the screen 100 from overflowing from the screen 100 into the opening 101.

The separator functions to separate materials of two different sizes (or liquid from solid) through the screen 100, by virtue of the vibratory motion imparted by the vibratory unit, including upper and lower eccentric weight (13 and 14, FIGURE 1) and the feed arrangement by which the material to be separated is fed onto the central area of the screen 100. As the material to be separated is fed onto the screen 100, the imparted vibratory motion causes the material to move along the screen 100, the oversize portion of the material being discharged through a discharge opening (not shown) at the periphery of the spacing frame (not shown). The undersize material which passes through the screen 100 falls onto a dome-shaped receiving pan (not shown) disposed below the screen 100 and, by falling along the dome-shape of the pan, is ultimately discharged through a discharge duct (not shown).

I claim:
1. A vibratory separator comprising
   a housing structure,
   a screen horizontally positioned in said housing structure, said screen having a central opening therethrough,
   tensioning means coupled between said housing and said screen for supporting the central area of said screen and for enabling the central area to be raised and lowered, said tensioning means including a support assembly having a plurality of arms coupled with said housing structure and an adjustable member coupled between the inner ends of said arms and the central area of said screen, conduit means projecting through said opening in said screen for supplying a fluid to the underside of said screen, said conduit means being unattached with respect to said housing structure and including a substantially vertical conduit member projecting through said opening and a substantially horizontal conduit member coupled with the lower end of said first conduit member and underlying said screen, and including a rotary member coupled with said first conduit member for allowing rotation of said substantially horizontal conduit member, and means for vibrating said screen and housing structure such that said conduit means is uneffected by the vibrations generated by said vibrating means.

2. A separator as in claim 1 wherein said screen includes a tension ring coupled at the opening therein, and said adjustable member engages said tension ring.

3. A vibratory separator comprising
a housing structure,
a screen horizontally positioned in said housing structure, said screen having a central discharge opening therethrough, and a tension ring coupled with said screen at said central opening, tensioning means coupled between said housing and said screen for supporting the central area of said screen, said tensioning means enabling the central area of said screen to be raised and lowered, and said tensioning means including a support assembly having a plurality of arms coupled with said housing structure and having at least one remotely operable tensioning member coupled between said arms and said tension ring for enabling adjustment at the central area of said screen, conduit means projecting through said opening in said screen for supplying a cleaning liquid to the underside of said screen, said conduit means including a substantially vertical conduit member projecting through said opening and a substantially horizontal conduit member coupled with the lower end of said first conduit member and underlying said screen, said conduit means includes rotary means coupled with said substantially vertical conduit member for allowing rotation of said substantially horizontal conduit member, and means for vibrating said screen and housing structure.

4. A vibratory separator comprising
a housing structure,
a screen horizontally positioned in said housing structure, said screen having a central discharge opening therethrough, and a flange member affixed to said screen at said central opening, tensioning means coupled between said housing and said screen for supporting the central area of said screen, said tensioning means enabling the central area of said screen to be raised and lowered, and said tensioning means including a support assembly having a plurality of arms coupled with said housing structure and having at least one remotely operable tensioning member coupled between said arms and the central area of said screen for enabling adjustment thereof, conduit means projecting through said opening in said screen for supplying a cleaning liquid to the underside of said screen, said conduit means including a substantially vertical conduit member projecting through said opening and a substantially horizontal conduit member coupled with the lower end of said first conduit member and underlying said screen, said conduit means includes rotary means coupled with said substantially vertical conduit member for allowing rotation of said substantially horizontal conduit member, and means for vibrating said screen and housing structure.

5. A vibratory separator comprising
a housing structure,
a screen horizontally positioned in said housing structure, said screen having a central discharge opening therethrough, and a conical duct attached to said screen at said opening for allowing material to pass through said duct to discharge means, tensioning means coupled between said housing and said screen for supporting the central area of said screen, said tensioning means enabling the central area of said screen to be raised and lowered, conduit means projecting through said opening in said screen for supplying a cleaning liquid to the underside of said screen, said conduit means including a substantially vertical conduit member projecting through said opening and a substantially horizontal conduit member coupled with the lower end of said first conduit member and underlying said screen, said conduit means includes rotary means coupled with said substantially vertical conduit member for allowing rotation of said substantially horizontal conduit member, means for vibrating said screen and housing structure, and said discharge means includes a deflector cone and a discharge pan, said deflector cone being affixed to said substantially horizontal conduit member and positioned intermediate said conical duct and said discharge pan.

References Cited

UNITED STATES PATENTS

| | | | |
|---|---|---|---|
| 456,585 | 7/1891 | Morse | 209—328 |
| 3,035,700 | 5/1962 | McCausland | 209— 319 X |
| 3,112,263 | 11/1963 | Ellia | 210—415 X |
| 144,988 | 11/1873 | La Croix | 209—325 |
| 1,701,126 | 2/1929 | Schiff | 209—380 X |
| 2,946,440 | 7/1960 | Simpson | 209—366.5 X |

FOREIGN PATENTS 1,184,611  12/1964  Germany.

HARRY B. THORNTON, Primary Examiner
ROBERT HALPER, Assistant Examiner

U.S. Cl. X.R.
207—380, 403